US009596615B1

United States Patent
Sun et al.

(10) Patent No.: US 9,596,615 B1
(45) Date of Patent: Mar. 14, 2017

(54) METHOD AND APPARATUS FOR ASSESSING A CONDITION OF A WIRELESS CHANNEL IN VIEW OF FEEDBACK UNDER STRONG AND SPORADIC INTERFERENCE RECEIVED OVER THE WIRELESS CHANNEL

(71) Applicant: Marvell International Ltd., Hamilton (BM)

(72) Inventors: Yakun Sun, Sunnyvale, CA (US); Leilei Song, Sunnyvale, CA (US); Hui-Ling Lou, Sunnyvale, CA (US); Vladan Petrovic, San Jose, CA (US); Yi-Ling Chao, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 150 days.

(21) Appl. No.: 14/319,552

(22) Filed: Jun. 30, 2014

Related U.S. Application Data

(60) Provisional application No. 61/842,727, filed on Jul. 3, 2013.

(51) Int. Cl.
*H04B 17/00* (2015.01)
*H04W 24/08* (2009.01)

(52) U.S. Cl.
CPC .................. *H04W 24/08* (2013.01)

(58) Field of Classification Search
CPC ..... H04W 16/14; H04W 24/02; H04W 24/10; H04W 88/08; H04W 88/085;

(Continued)

(56) References Cited

U.S. PATENT DOCUMENTS 8,340,580 B1  12/2012  Epstein
8,417,252 B2 *  4/2013  Palanki  ................. H04L 1/0028
                                                            370/328

(Continued)

OTHER PUBLICATIONS

IEEE Std 802.16-2009 (Revision of IEEE Std 802.16-2004), IEEE Standard for Local and metropolitan area networks Part 16: Air Interface for Broadband Wireless Access Systems, LAN/MAN Standards Committee, IEEE Computer Society, IEEE Microwave Theory and Techniques Society (May 13, 2009) IEEE-SA Standards Board, 2082 pages.

(Continued)

*Primary Examiner* — Ajibola Akinyemi

(57) ABSTRACT

A wireless communication device including an interference module and a feedback generation module. The interference module is configured to detect interference on a communication channel, identify types of the interference detected on the communication channel, and provide information about the types of the interference detected on the communication channel. The feedback generation module is configured to receive a request, from a transmitter, for feedback about a condition of the communication channel, and, based on the request and the information about the types of the interference detected on the communication channel, determine a measurement region of the communication channel, generate the feedback about the condition of the communication channel using measurements taken, by a receiver, in the measurement region as determined by the feedback generation module, and provide the feedback to the transmitter.

20 Claims, 4 Drawing Sheets

(58) Field of Classification Search
CPC ........... H04W 74/0833; H04W 84/045; H04W 24/08; H04W 36/0083; H04W 48/08; H04W 72/02; H04W 72/04; H04W 72/0453; H04W 72/1278; H04W 76/00; H04W 76/023; H04W 80/00
USPC ...................................................... 455/67.13
See application file for complete search history.

(56) References Cited

U.S. PATENT DOCUMENTS

| | | |
|---|---|---|
| 2011/0211523 A1 | 9/2011 | Seo et al. |
| 2012/0069766 A1 | 3/2012 | Fu et al. |
| 2012/0207040 A1 | 8/2012 | Comsa et al. |
| 2012/0224610 A1 | 9/2012 | Baldemair |
| 2014/0369278 A1 | 12/2014 | Song et al. |

OTHER PUBLICATIONS

IEEE Std 802.11-2012 (Revision of IEEE Std 802.11-2007), IEEE Standard for Information technology—Telecommunications and information exchange between systems Local and metropolitan area networks, Part 11: Wireless LAN Medium Access Control (MAC) and Physical Layer (PHY) Specifications, LAN/MAN Standards Committee of the IEEE Computer Society (Feb. 6, 2012), IEEE-SA Standards Board, 2793 pages.

IEEE Std. 802.11a-1999; Supplement to IEEE Standard for Information Technology—Telecommunications and information exchange between systems—Local and metropolitan area networks—Specific requirements; Part: 11 Wireless LAN Medium Access Control (MAC) and Physical Layer (PHY) specifications; High-speed Physical Layer in the 5 GHz Band; pp. 1-91.

IEEE P802.11g/D8.2 Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; Apr. 2003; 69 pages.

IEEE P802.11n: TGn Sync Proposal Technical Specifications; Syed Aon Mujtaba; IEEE 802.11-04/0889r6; May 2005; 131 pages.

IEEE P802.11ac™ /D5.0; Draft Standard for Information Technology—Telecommunications and information exchange between systems—Local and metropolitan area networks—Specific requirements: Part 11: Wireless LAN Medium Access Control (MAC) and Physcial Layer (PHY) specifications: Amendment 4: Enhancements for Very High Throughput for Operation in Bands below 6 GHz; Jan. 2013; 440 Pages.

IEEE Std. 802.11b; Supplement to IEEE Standard for Information technolgy—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; Sep. 16, 1999; 96 Pages.

IEEE Std 802.20-2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.

IEEE Std. P802.11ad/D5.0; Draft Standard for information technology—Telecommunications and information exchange between systems Local and metropolitan area networks—Specific requirements; Part 11: Wireless LAN Medium Access Control (MAC) and Physical Layer (PHY) Specifications; Amendment 3: Enhancements for Very High Throughput in the 60 GHz Band; Sep. 2011; 601 Pages.

IEEE P802.11ah/D1.0 Draft Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications; Amendment 6: Sub 1 GHz License Exempt Operation; Oct. 2013; 394 Pages.

\* cited by examiner

METHOD AND APPARATUS FOR ASSESSING A CONDITION OF A WIRELESS CHANNEL IN VIEW OF FEEDBACK UNDER STRONG AND SPORADIC INTERFERENCE RECEIVED OVER THE WIRELESS CHANNEL

CROSS-REFERENCE TO RELATED APPLICATIONS

This application claims the benefit of U.S. Provisional Application No. 61/842,727, filed on Jul. 3, 2013. The entire disclosure of the application referenced above is incorporated herein by reference.

FIELD

The present disclosure relates to systems and methods for adapting feedback about a communication channel in view of predicted and detected interference.

BACKGROUND

A wireless communication device such as a long-term evolution (LTE) user equipment (UE) device receives signals from an LTE base station (BS). For example, the UE device may be a 3G and/or 4G wireless (e.g., cellular) communication device. Accordingly, the UE device may include an LTE transceiver. The UE device may also include one or more other types of transceivers (that coexist with the LTE transceiver within the UE device) configured to communicate according to non-LTE protocols. For example, the UE device may include a WiFi transceiver and/or a Bluetooth transceiver. Signals received by one of the transceivers (e.g., signals received by the LTE transceiver from the LTE BS) may experience interference from signals transmitted and/or received by one of the other transceivers (e.g., signals transmitted from the UE device by the WiFi transceiver), or transmitted between other devices in the vicinity of the UE device.

Some types of devices may use different frequency bands. However, the different frequency bands may be adjacent to one another and communication on the adjacent bands can cause interference. For example, a 2.4 GHz Industrial, Scientific, and Medical (ISM) frequency band may be adjacent to bands used by Mobile Wireless Standards (MWS) technologies.

SUMMARY

A wireless communication device includes an interference module configured to detect interference on a communication channel, identify types of the interference detected on the communication channel, and provide information about the types of the interference detected on the communication channel. A feedback generation module is configured to receive a request, from a transmitter, for feedback about a condition of the communication channel, and, based on the request and the information about the types of the interference detected on the communication channel, determine a measurement region of the communication channel, generate the feedback about the condition of the communication channel using measurements taken, by a receiver, in the measurement region as determined by the feedback generation module, and provide the feedback to the transmitter.

A method for operating a wireless communication device includes detecting interference on a communication channel, identifying types of the interference detected on the communication channel, providing information about the types of the interference detected on the communication channel, and receiving a request, from a transmitter, for feedback about a condition of the communication channel. The method further includes, based on the request and the information about the types of the interference detected on the communication channel, determining a measurement region of the communication channel, generating the feedback about the condition of the communication channel using measurements taken, by a receiver, in the determined measurement region, and providing the feedback to the transmitter.

Further areas of applicability of the present disclosure will become apparent from the detailed description, the claims and the drawings. The detailed description and specific examples are intended for purposes of illustration only and are not intended to limit the scope of the disclosure.

DESCRIPTION

Figure 1:
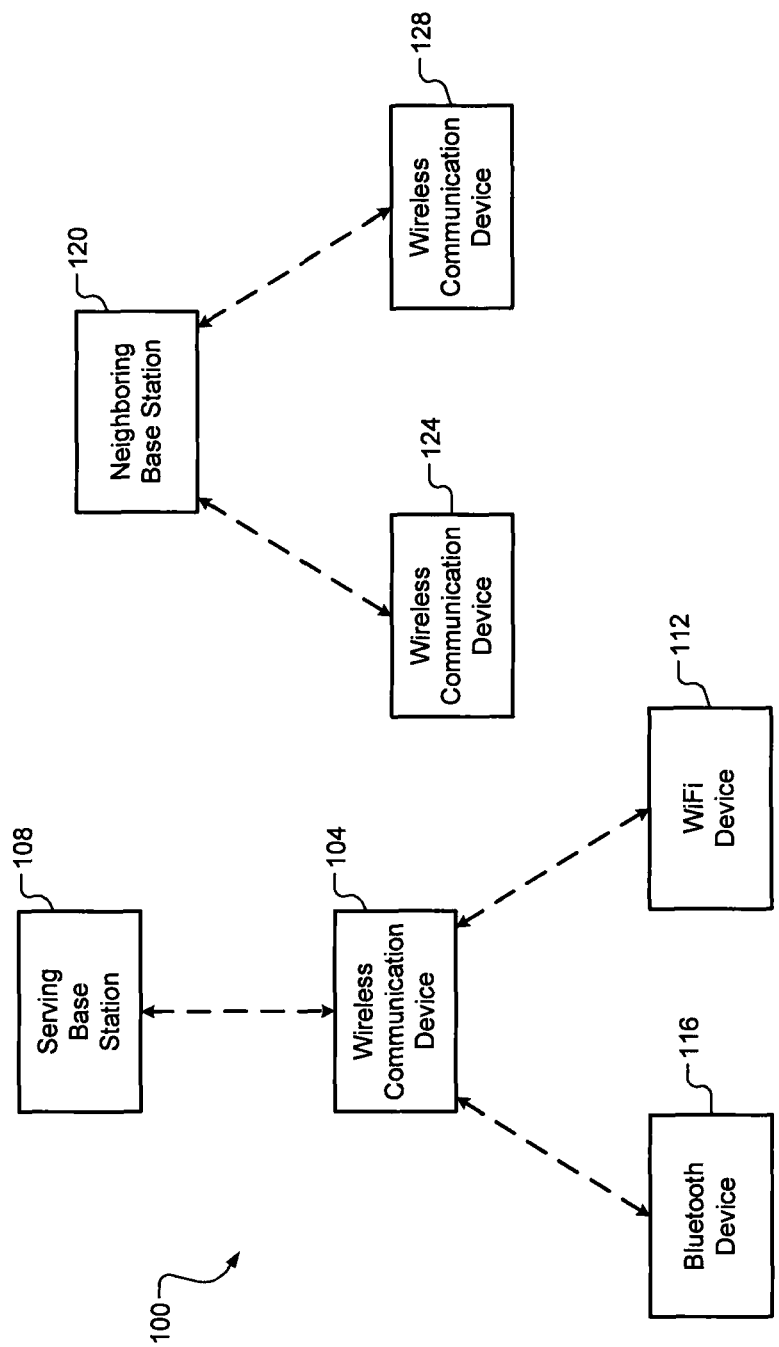
FIG. 1 is an example system including a wireless communication device configured according to an embodiment of the present disclosure.

A wireless communication device (e.g., a cellular device such as a mobile phone, tablet computer, laptop computer, or other device configured to communicate over a cellular network) may receive cellular signals from (and transmit cellular signals to) a base station (e.g., a serving base station) using a communication channel. For example, the wireless communication device may correspond to a 3G, 4G, or other long-term evolution (LTE) user equipment (UE) device.

The wireless communication device typically includes one or more transceivers, each including a transmitter portion and a receiver portion. The receiver portion gathers information about the communication channel and provides feedback incorporating the information to the transmitter portion, which operates according to the feedback. For example, the receiver portion may gather information including, but not limited to, channel quality and state information (e.g., 3GPP channel state information), radio measurements/reports (e.g., reference signal received power (RSRP), reference signal received quality (RSRQ), 3GPP radio link monitoring (RLM), and/or a received signal strength indicator (RSSI) in 3GPP, 802.11, 802.16, etc.), and/or location measurements (e.g., 3GPP or 802.11 positioning measurements). The feedback may include this gathered information as well as other information (e.g., an acknowledgment (ACK) frame or a negative acknowledgment (NACK) frame).

Because the transmitter portion uses the feedback to determine various operating parameters for transmitting on the communication channel, it is desirable (and generally assumed, by the transmitter portion) for the feedback to be an accurate representation of the communication channel. Accordingly, if the feedback provided by the receiver portion is unreliable, performance of the transmitter portion may be degraded.

However, the wireless communication device may receive interfering signals from radio sources other than the serving base station. For example, nearby devices such as WiFi and Bluetooth devices may communicate in a frequency band overlapping and/or adjacent to a frequency band used for communication between the serving base station and the wireless communication device. In some implementations, the wireless communication device may include other types of transceivers (referred to herein as "coexisting transceivers") that coexist with the LTE transceiver within the wireless communication device—e.g., a WiFi transceiver, and/or a Bluetooth transceiver. Accordingly, WiFi signals and/or Bluetooth signals (transmitted from other devices and/or from the wireless communication device) may cause interference on the communication channel. Further, communication between a neighboring base station (i.e., not the serving base station) and other devices associated with the neighboring base station can cause interference on the communication channel. The interference adversely affects the feedback generated by the receiver portion (i.e., the interference causes the receiver portion to gather inaccurate information is not representative of the actual condition of the communication channel).

The receiver portion may send the feedback to the transmitter portion periodically, in response to receiving a request for the feedback from the transmitter portion, and/or in response to some other trigger (e.g., a trigger specified by the transmitter portion). Accordingly, when the feedback will need to be provided by the receiver portion can be predictable (e.g., periodic feedback) or unpredictable (e.g., feedback in response to a request or a trigger). Similarly, interference on the communication channel can be persistent and predictable (e.g., communication from a neighboring base station) or unpredictable (e.g., sporadic/burst interference, such as interference from coexisting transceivers).

Persistent interference is measured as part of the condition of the communication channel and/or the signal strength associated with signals transmitted on the communication channel (e.g., signal-to-interference-plus-noise-ratio, or SINR). Accordingly, the persistent interference is represented in the feedback provided by the receiver portion to the transmitter portion. For example, the persistent interference may be caused by a neighboring base station, and therefore be included in the feedback to reflect a relatively low channel quality caused by constant interference.

Conversely, sporadic interference, which is not as predictable as the persistent interference, may result in a sudden change in the condition of the communication channel. Accordingly, if the sporadic interference occurs when the receiver portion is gathering information about the communication channel for feedback, the feedback will not be an accurate representation of the communication channel. Instead, the feedback will correspond to the significantly degraded (but temporary) channel condition as caused by the sporadic interference. In other words, if the feedback incorporates information gathered during the sporadic interference, the transmitter portion may incorrectly assume that the condition of the communication channel is poor and operate accordingly.

A wireless communication device according to one embodiment of the present disclosure includes a receiver that implements a feedback module and an interference module. The feedback module and the interference module operate to minimize the impact of sporadic interference on the feedback provided to the transmitter. For example, the interference module is configured to predict and/or detect interference on the communication channel, and provide information about the interference to the feedback module. The feedback module is configured to provide the feedback to the transmitter that compensates for the interference (i.e., the feedback module generates adapted feedback). For example only, the feedback module may modify the feedback to remove any contributions from the interference, gather information about the communication channel before and/or after the interference, withhold feedback that was generated during interference, provide previously generated feedback, etc.

The principles of the present disclosure may be implemented in a wireless communication device configured to operate according to communication protocols including, but not limited to, orthogonal frequency division multiplexing (OFDM) protocols such as IEEE 802.11a, 802.11g, 802.11n, 802.11ac, 3G LTE, WiMax, etc., non-OFDM communication protocols such as IEEE 802.11b, Bluetooth, universal mobile telecommunications system (UMTS), evolved high speed packet access (HSPA+), enhanced voice-data optimized (EVDO), etc., and various coexistence systems including communication according to LTE, WiFi, Bluetooth, etc.

FIG. 1 shows an example system 100 including a wireless communication device 104 configured according to an embodiment of the present disclosure. The wireless communication device 104 communicates with a serving base station 108. For example only, the wireless communication device may correspond to a smartphone or other device configured to communicate via an LTE cellular communication protocol with the base station 108.

The wireless communication device 104 may receive interfering signals from other devices, such as a WiFi device 112 and/or a Bluetooth device 116. For example, the wireless communication device 104 may include coexisting cellular, WiFi, and Bluetooth transceivers, and/or the interfering signals may correspond to communication between the WiFi device 112 or the Bluetooth device 116 and other devices (not shown). The wireless communication device 104 may also experience interference caused by communication between a neighboring base station 120 and one or more associated wireless communication devices 124 . . . 128.

Figure 2:
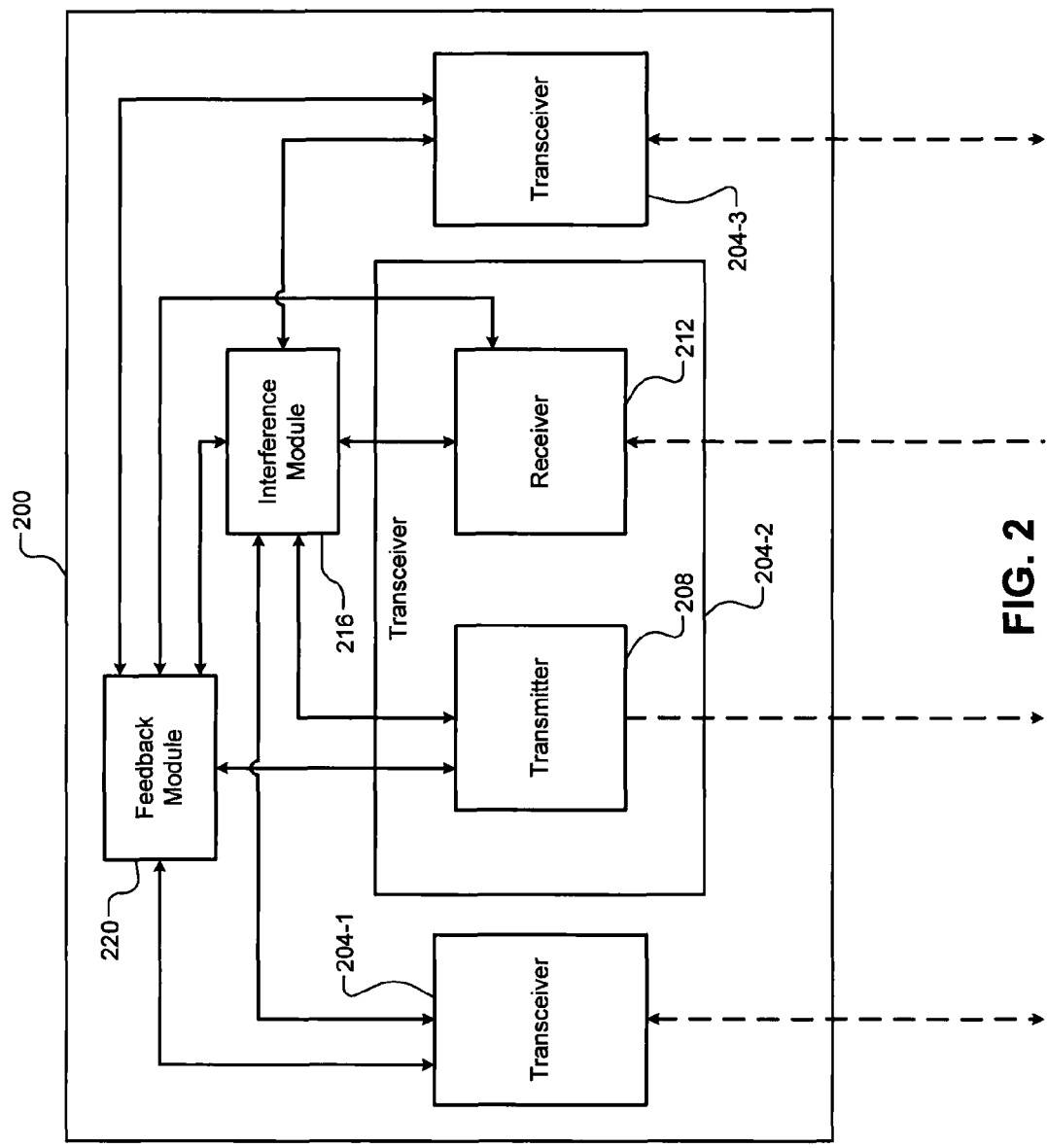
FIG. 2 is an example wireless communication device including an interference module and a feedback module according to an embodiment of the present disclosure.

FIG. 2 shows an example wireless communication device 200 according to an embodiment of the present disclosure. The wireless communication device 200 includes one or more transceivers 204-1, 204-2, and 204-3, referred to collectively as transceivers 204. Each of the transceivers 204 may correspond to a different communication protocol. For example, the transceiver 204-1 may correspond to a WiFi transceiver, the transceiver 204-2 may correspond to a LTE cellular transceiver, and the transceiver 204-3 may correspond to a Bluetooth transceiver. Accordingly, the transceivers 204 may operate in a coexistence configuration within the wireless communication device 200. Although the adapted feedback operation will be described, as an example, with respect to interference caused by multiple transceivers in the same device, the principles of the present disclosure may also be implemented with respect to interference caused by one or more transceivers external to the wireless communication device 200.

The transceiver 204-2 includes a transmitter 208 and a receiver 212. An interference module 216 and a feedback module 220 each communicate with the transmitter 208 and the receiver 212 of the transceiver 204-2, as well as with respective transmitters and receivers (not shown) of the transceivers 204-1 and 204-3. Specifically, the interference module 216 communicates with each of the transceivers 204 to identify predictable interference (e.g., from data packets expected to be received by or transmitted from one of the transceivers 204), to identify detected constant interference (e.g., such as interference caused by communication to and from a neighboring base station), to detect sporadic interference (e.g., sporadic interference caused by other wireless communication devices and/or one of the transceivers 204), and to provide information about the predicted interference, the constant interference, and the sporadic interference to the feedback module 220. The feedback module 220 generates feedback, and provides the feedback, to respective transmitters (e.g., the transmitter 208) of the transceivers 204 based on the information about the interference received from the interference module 216.

For example, the interference module 216 may receive information about data packets expected to be received by or transmitted from the transceivers 204-1 and 204-2 and provide information about corresponding predicted interference to the feedback module 220. Conversely, the interference module 216 may receive information about data packets expected to be transmitted from the transmitter 208 or received by the receiver 212, and provide information about the corresponding predicted interference to the feedback module 220. For example only, the information about the data packets expected to be received or transmitted may include expected transmission/reception timing of the data packets. The interference module 216 may also generate information about generally constant interference caused by devices such as a neighboring base station, and provide information about the constant interference to the feedback module 220.

The interference module 216 dynamically detects sporadic interference on the communication channel. The interference module 216 provides (e.g., separately from the information about the predicted or constant interference) the information about the detected sporadic interference to the feedback module 220. For example only, the information about the detected sporadic interference may include information about the strength, timing, and/or frequency ranges of the interference.

The feedback module 220 selectively generates and/or adapts the feedback based on the information about the predicted interference, the constant interference, and the sporadic interference. For example, the feedback module 220 is configured to minimize effects of the sporadic interference on the feedback while incorporating the information about the constant interference into the feedback. In this manner, the feedback provided to the transmitter 208 is a more accurate representation of the condition of the communication channel.

Figure 3:
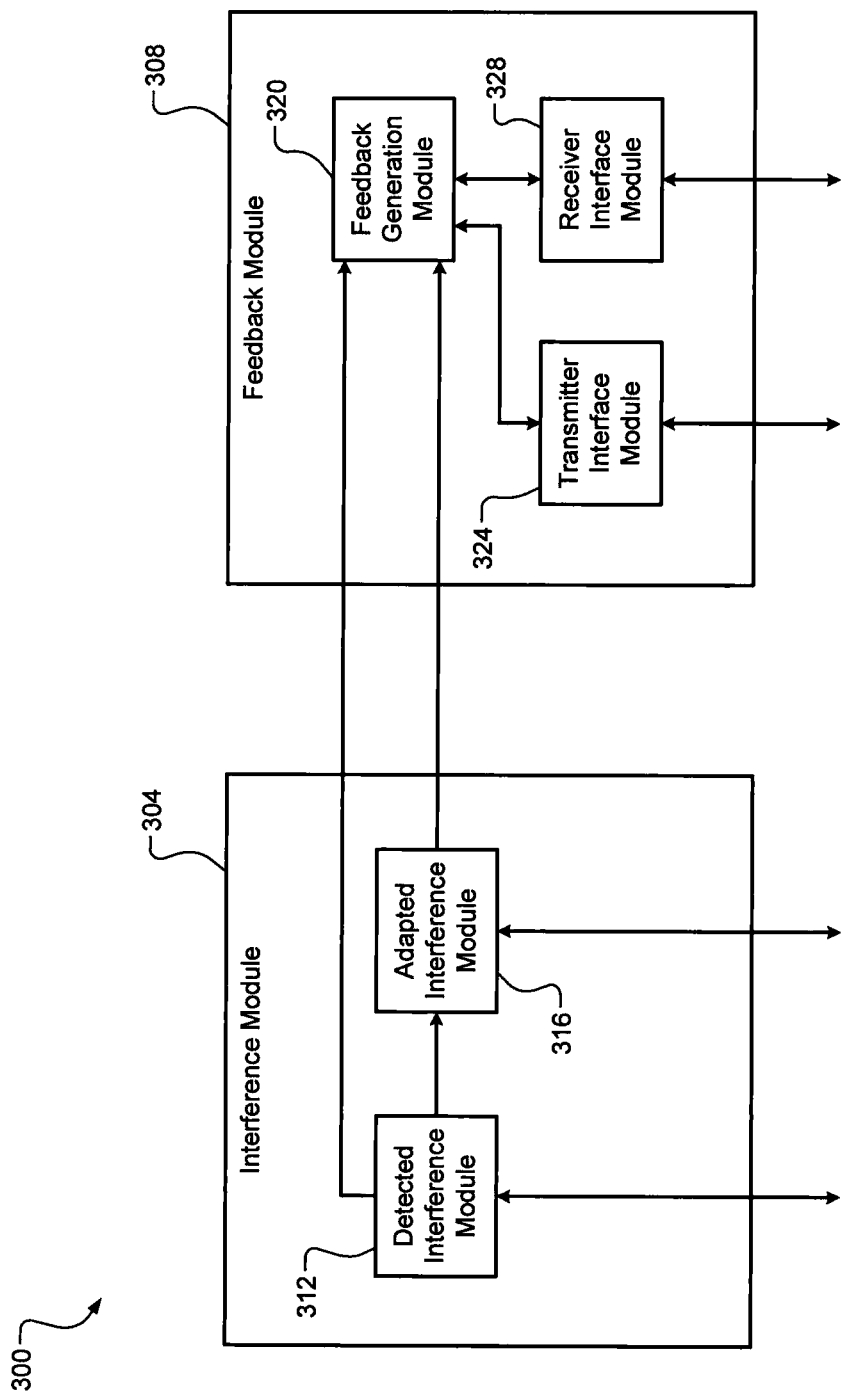
FIG. 3 is an example interference module and an example feedback module according to an embodiment of the present disclosure.

FIG. 3 shows a system 300 including an example interference module 304 and an example feedback module 308 according to an embodiment of the present disclosure. The interference module includes an interference detection module 312 and an adapted interference module 316. The interference detection module 312 detects interference on the communication channel. For example, the interference detection module 312 detects interference according to channel measurements performed by the receiver 212. The detected interference may correspond to both constant interference and sporadic interference. In other words, the detected interference includes both interference that is, in general, constantly detected on the communication channel (i.e., constant interference) and therefore should be included in feedback about the communication channel, and interference that occurs less frequently and therefore should be minimized in the feedback about the communication channel (i.e., sporadic interference).

The interference detection module 312 provides information about the constant interference to feedback module 308. Conversely, the interference detection module 312 provides information about the sporadic interference to adapted interference module 316. The adapted interference module 316 gathers information about interference that may be avoided and/or minimized during feedback calculation. For example, the adapted interference module 316 receives the information about the sporadic interference detected by the interference detection module 312, and also communicates with the transceivers 204 to receive information about predicted data packets that will be transmitted or received. For example, the adapted interference module 316 determines timing and/or frequency ranges of the sporadic interference and interference that will be caused by the predicted data packets (i.e., predicted interference), and provides this information to the feedback module 308.

The feedback module 308 receives the interference information from the interference module 304, including the information about the constant interference from the interference detection module 312 and the timing and/or frequency information about the sporadic interference and the predicted interference from the adapted interference module 316. For example, the feedback module includes a feedback generation module 320, a transmitter interface module 324, and a receiver interface module 328. The feedback generation module 320 selectively generates and provides the feedback to the transmitter interface module 324 based on the information about the constant, sporadic, and predicted interference received from the interference module 304 and requests for feedback received (via the transmitter interface module 324) from a transmitter (e.g., transmitter 208), which provides the feedback to the transmitter 208. The feedback generation module 320 may also communicate with the receiver 212 (via the receiver interface module 328) to control information provided from the receiver 212 to the transmitter 208 related to feedback.

For example, the transmitter interface module 324 receives requests for feedback from the transmitter 208. The requests may include, but are not limited to, on-demand requests (i.e., requests for feedback to be provided in response to the request), information about requests for periodic feedback, and/or information about triggered feedback. The transmitter interface module 324 provides the requests for feedback to the feedback generation module 320.

The feedback generation module 320 provides feedback to the transmitter 208 via the transmitter interface module 324 in accordance with the requests and the information received from the interference module 304. For example, the feedback generation module 320 generates the feedback (including channel state information, etc.) based on various measurements of the communication channel performed by the receiver 212, and incorporates the information about the constant interference. However, the feedback generation module 320 is configured to adapt the feedback to minimize, avoid, and/or eliminate interference caused by the sporadic or predicted interference as indicated by the adapted interference module 316.

For example, the feedback generation module 320 may use the information received from the interference module 304 to generate the feedback according to a time and/or frequency that the communication channel is not (or less) affected by the predicted or sporadic interference. In other words, when the feedback is generated in response to an on-demand request or a periodic request and the timing of the request corresponds to the timing of sporadic or predicted interference, the feedback generation module 320 generates the feedback based on communication channel measurements prior to or subsequent to the sporadic interference, or in a different frequency range than a frequency range affected by the sporadic or predicted interference.

In another example, the feedback generation module 320 may generate the feedback based on previous communication channel measurements instead of current communication channel measurements that include sporadic or predicted interference. The feedback generation module 320 may filter the previous communication channel measurements to generate the feedback in response to the request.

In another example, the feedback generation module 320 may selectively abstain from providing any feedback in response to a request if sporadic or predicted interference significantly affects the feedback. For example, the transmitter 208 may be configured to provide another request for feedback or use other schemes for channel state information estimation if feedback is not received within a predetermined time of sending the request.

In some embodiments (i.e., some communication protocols), the receiver 212 is configured to send an acknowledgment (ACK) frame or a negative acknowledgment (NACK) frame to the transmitter 208 to indicate whether a packet transmitted by the transmitter 208 was properly received by the receiver 212. For example, the transmitter 208 may transmit the package at a coding rate based on a current condition of the communication channel under typical interference levels. Typically, if strong interference occurs while the receiver 212 is receiving the packet, the receiver 212 may fail to decode the packet, and accordingly sends a NACK frame to the transmitter 208 (e.g., an automatic repeat request or a hybrid automatic repeat request). The transmitter 208 may respond to the NACK frame by, for example, transmitting additional parity bits or taking other suitable measures.

Conversely, in the case of strong interference caused by sporadic or predicted interference indicated by the interference module 304, the feedback generation module 320 according to an embodiment of the present disclosure selectively instructs the receiver 212 to abstain from transmitting the NACK frame. Accordingly, the transmitter 208 does not receive that NACK frame, and instead of merely transmitting additional parity bits or taking other measures, the transmitter 208 may retransmit the entire packet. In other words, without receiving the NACK frame, the transmitter 208 assumes the receiver 212 did not receive the packet, and therefore retransmits the packet to the receiver 212.

Figure 4:
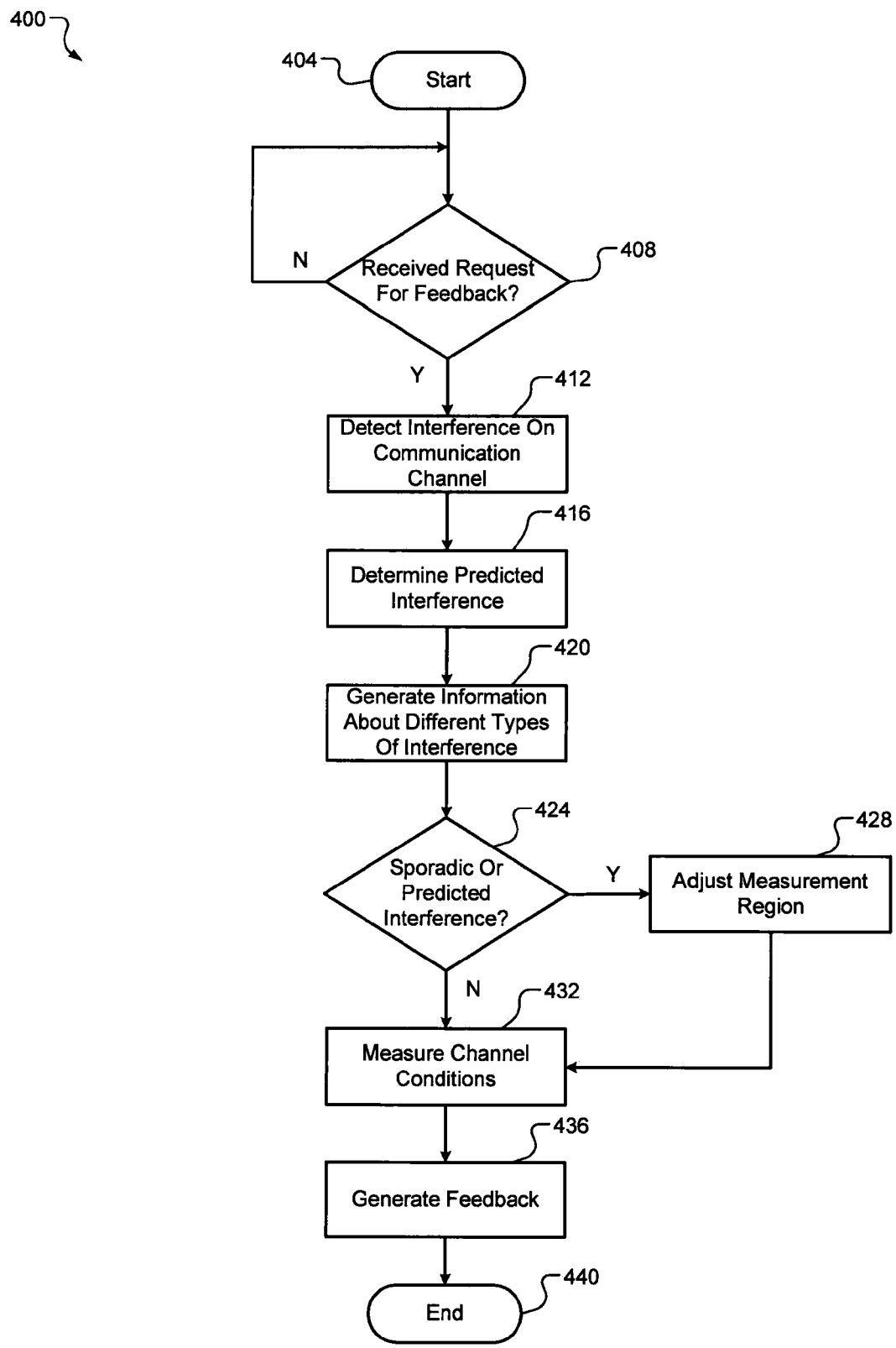
FIG. 4 is an example method for providing feedback about a communication channel to a transmitter according to an embodiment of the present disclosure In the drawings, reference numbers may be reused to identify similar and/or identical elements.

FIG. 4 shows an example method 400 for providing feedback about a communication channel to a transmitter. The method 400 begins at 404. At 408, the method 400 determines whether a request was received for feedback about a communication channel. If true, the method 400 continues to 412. If false, the method 400 continues to 408. At 412, the method 400 detects interference on the communication channel (e.g., including both constant interference and sporadic interference). At 416, the method 400 determines predicted interference on the communication channel (e.g., interference to be caused by expected transmission or reception of known data packets). At 420, the method 400 generates information about the different types of interference (e.g., constant, sporadic, or predicted interference). For example, the information may include timing and/or frequency ranges of the sporadic or predicted interference.

At 424, the method 400 determines whether the information includes information about sporadic or predicted interference. If true, the method 400 continues to 428. If false, the method 400 continues to 432. At 428, the method 400 adjusts a measurement region (e.g., a frequency region or time region where the measurement will take place) based on the information about the sporadic or predicted interference. For example, the method 400 may adjust timing and/or frequency of measurements to be performed on the communication channel to avoid the interference. At 432, the method 400 measures conditions of the communication channel. At 436, the method 400 generates feedback about the communication channel according to the measured conditions of the communication channel. The method 400 ends at 440.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory circuits (such as a flash memory circuit or a mask read-only memory circuit), volatile memory circuits (such as a static random access memory circuit and a dynamic random access memory circuit), and secondary storage, such as magnetic storage (such as magnetic tape or hard disk drive) and optical storage.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Perl, Javascript®, HTML5, Ada, ASP (active server pages), Perl, Scala, Erlang, Ruby, Flash®, Visual Basic®, Lua, or Python®.

None of the elements recited in the claims is intended to be a means-plus-function element within the meaning of 35 U.S.C. §112(f) unless an element is expressly recited using the phrase "means for", or in the case of a method claim using the phrases "operation for" or "step for".

What is claimed is:

1. A wireless communication device, comprising:
   an interference module configured to (i) detect interference on a communication channel, (ii) identify which of a first type of interference and a second type of interference the detected interference corresponds to, and (iii) provide information about which of the first type of interference and the second type of interference the detected interference corresponds to, wherein the second type of interference occurs less frequently than the first type of interference; and
   a feedback generation module configured to (i) receive a request, from a transmitter, for feedback about a condition of the communication channel, and (ii) based on the request and the information about which of the first type of interference and the second type of interference the detected interference corresponds to,
   (a) determine a measurement region of the communication channel,
   (b) generate the feedback about the condition of the communication channel using measurements taken, by a receiver, in the measurement region as determined by the feedback generation module, and
   (c) provide the feedback to the transmitter.

2. The wireless communication device of claim 1, wherein the condition of the communication channel corresponds to a condition for receiving a packet through the communication channel.

3. The wireless communication device of claim 1, wherein the request corresponds to a request for periodic feedback about the condition of the communication channel.

4. The wireless communication device of claim 1, further comprising a receiver interface module configured to provide information, received from the receiver, about the condition of the communication channel to the feedback generation module.

5. A wireless communication device, comprising:
   an interference module configured to (i) detect interference on a communication channel, (ii) identify types of the interference detected on the communication channel, and (iii) provide information about the types of the interference detected on the communication channel; and
   a feedback generation module configured to (i) receive a request, from a transmitter, for feedback about a condition of the communication channel, and (ii) based on the request and the information about the types of the interference detected on the communication channel,
   (a) determine a measurement region of the communication channel,
   (b) generate the feedback about the condition of the communication channel using measurements taken, by a receiver, in the measurement region as determined by the feedback generation module, and
   (c) provide the feedback to the transmitter,
   wherein the types of the interference include (i) constant interference on the communication channel, (ii) sporadic interference on the communication channel, and (iii) predicted interference on the communication channel, wherein the predicted interference corresponds to expected data packets to be transmitted or received on the communication channel.

6. The wireless communication device of claim 5, wherein, to determine the measurement region of the communication channel, the feedback module is configured to (i)

determine whether the types of the interference detected on the communication channel include the sporadic interference or the predicted interference and (ii) determine the measurement region of the communication channel according to a region of the communication channel that does not include the sporadic interference or the predicted interference.

7. The wireless communication device of claim 6, wherein the region of the communication channel corresponds to a frequency range of the communication channel or a time period on the communication channel.

8. A wireless communication device, comprising:
an interference module configured to (i) detect interference on a communication channel, (ii) identify types of the interference detected on the communication channel, and (iii) provide information about the types of the interference detected on the communication channel; and
a feedback generation module configured to (i) receive a request, from a transmitter, for feedback about a condition of the communication channel, and (ii) based on the request and the information about the types of the interference detected on the communication channel,
 (a) determine a measurement region of the communication channel,
 (b) generate the feedback about the condition of the communication channel using measurements taken, by a receiver, in the measurement region as determined by the feedback generation module, and
 (c) provide the feedback to the transmitter,
wherein the feedback generation module is configured to, based on the information about the types of the interference detected on the communication channel, instruct the receiver not to transmit an acknowledgment frame to the transmitter.

9. A wireless communication device, comprising:
an interference module configured to (i) detect interference on a communication channel, (ii) identify types of the interference detected on the communication channel, and (iii) provide information about the types of the interference detected on the communication channel; and
a feedback generation module configured to (i) receive a request, from a transmitter, for feedback about a condition of the communication channel, and (ii) based on the request and the information about the types of the interference detected on the communication channel,
 (a) determine a measurement region of the communication channel,
 (b) generate the feedback about the condition of the communication channel using measurements taken, by a receiver, in the measurement region as determined by the feedback generation module, and
 (c) provide the feedback to the transmitter,
wherein the feedback generation module is configured to, based on the request and the information about the types of the interference detected on the communication channel, selectively abstain from providing the feedback to the transmitter.

10. A wireless communication device, comprising:
an interference module configured to (i) detect interference on a communication channel, (ii) identify types of the interference detected on the communication channel, and (iii) provide information about the types of the interference detected on the communication channel; and
a feedback generation module configured to (i) receive a request, from a transmitter, for feedback about a condition of the communication channel, and (ii) based on the request and the information about the types of the interference detected on the communication channel,
 (a) determine a measurement region of the communication channel,
 (b) generate the feedback about the condition of the communication channel using measurements taken, by a receiver, in the measurement region as determined by the feedback generation module, and
 (c) provide the feedback to the transmitter,
wherein the feedback generation module is configured to, based on the request and the information about the types of the interference detected on the communication channel, selectively provide previously calculated feedback information to the transmitter.

11. A method for operating a wireless communication device, the method comprising:
detecting interference on a communication channel;
identifying which of a first type of interference and a second type of interference the detected interference corresponds to, wherein the second type of interference occurs less frequently than the first type of interference;
providing information about which of the first type of interference and the second type of interference the detected interference corresponds to;
receiving a request, from a transmitter, for feedback about a condition of the communication channel; and
based on the request and the information about which of the first type of interference and the second type of interference the detected interference corresponds to,
 (a) determining a measurement region of the communication channel,
 (b) generating the feedback about the condition of the communication channel using measurements taken, by a receiver, in the determined measurement region, and
 (c) providing the feedback to the transmitter.

12. The method of claim 11, wherein the condition of the communication channel corresponds to a condition for receiving a packet through the communication channel.

13. The method of claim 11, wherein the request corresponds to a request for periodic feedback about the condition of the communication channel.

14. The method of claim 11, further comprising providing information, received from the receiver, about the condition of the communication channel.

15. The method of claim 11, further comprising, based on the information about which of the first type of interference and the second type of interference the detected interference corresponds to, instructing the receiver not to transmit an acknowledgment frame to the transmitter.

16. The method of claim 11, further comprising, based on the request and the information about which of the first type of interference and the second type of interference the detected interference corresponds to, selectively abstaining from providing the feedback to the transmitter.

17. The method of claim 11, further comprising, based on the request and the information about which of the first type of interference and the second type of interference the detected interference corresponds to, selectively providing previously calculated feedback information to the transmitter.

18. A method for operating a wireless communication device, the method comprising:
detecting interference on a communication channel;

identifying types of the interference detected on the communication channel;
providing information about the types of the interference detected on the communication channel;
receiving a request, from a transmitter, for feedback about a condition of the communication channel; and
based on the request and the information about the types of the interference detected on the communication channel,
  (a) determining a measurement region of the communication channel,
  (b) generating the feedback about the condition of the communication channel using measurements taken, by a receiver, in the determined measurement region, and
  (c) providing the feedback to the transmitter,
wherein the types of the interference include (i) constant interference on the communication channel, (ii) sporadic interference on the communication channel, and (iii) predicted interference on the communication channel, wherein the predicted interference corresponds to expected data packets to be transmitted or received on the communication channel.

19. The method of claim 18, wherein determining the measurement region of the communication channel includes (i) determining whether the types of the interference detected on the communication channel include the sporadic interference or the predicted interference and (ii) determining the measurement region of the communication channel according to a region of the communication channel that does not include the sporadic interference or the predicted interference.

20. The method of claim 19, wherein the region of the communication channel corresponds to a frequency range of the communication channel or a time period on the communication channel.

* * * * *